United States Patent [19]

Pike

[11] Patent Number: 6,145,101
[45] Date of Patent: Nov. 7, 2000

[54] COMPUTER SYSTEM MANAGEMENT USING DEDICATED CELLULAR APPLIANCE

[75] Inventor: Jimmy D. Pike, Lexington, S.C.

[73] Assignee: NCR Corporation, Dayton, Ohio

[21] Appl. No.: 08/767,762

[22] Filed: Dec. 17, 1996

[51] Int. Cl.$^7$ .................................................. G06F 11/32
[52] U.S. Cl. ................................................ 714/46; 714/57
[58] Field of Search ........................ 395/183.22, 185.01, 395/185.1, 183.01; 379/29, 39, 40, 41; 455/423

[56] References Cited

U.S. PATENT DOCUMENTS

| | | | |
|---|---|---|---|
| 4,481,574 | 11/1984 | DeFino et al. | 364/200 |
| 5,036,514 | 7/1991 | Downes et al. | 371/51 |
| 5,151,579 | 9/1992 | Maginness | 235/375 |
| 5,367,667 | 11/1994 | Wahlquist et al. | 395/183.22 |
| 5,398,257 | 3/1995 | Groenteman | 375/200 |
| 5,576,689 | 11/1996 | Queen | 340/514 |
| 5,726,636 | 3/1998 | Hayes, Jr. | 340/636 |
| 5,745,692 | 4/1998 | Lohmann, II et al. | 395/200.53 |
| 5,748,884 | 5/1998 | Royce et al. | 395/185.1 |
| 5,748,896 | 5/1998 | Daly et al. | 395/200.53 |
| 5,809,437 | 9/1998 | Breed | 701/29 |
| 5,854,828 | 12/1998 | Kocis et al. | 379/93.31 |

*Primary Examiner*—Robert W. Beausoliel, Jr.
*Assistant Examiner*—Scott T. Baderman
*Attorney, Agent, or Firm*—Gregory A. Welte

[57] ABSTRACT

A reporting system for a computer network. A server in the computer network monitors error status of various components within the network. When the error status indicates that human intervention is required, the server contacts a system manager, through a cellular telephone network. The server delivers a message indicating the error status to the manager, as by a synthesized speech message which describes the status.

15 Claims, 6 Drawing Sheets

COMPUTER SYSTEM MANAGEMENT USING DEDICATED CELLULAR APPLIANCE

The invention concerns a remote-access terminal, for use by a system manager of a computer system, which uses a cellular telephone network for diagnosing problems in the system.

BACKGROUND OF THE INVENTION

Many computer systems operate twenty-four hours per day. The system manager of such a system is frequently expected to perform management and troubleshooting tasks at any time of day or night. Because no restriction exists as to the times at which the manager's tasks may be required, the system manager often performs the tasks from remote locations, using a terminal, or computer, to communicate with the computer system.

Typically, communication between the system manager and the computer system utilizes the public-access telephone system, although dedicated, private, telephone lines are sometimes used. However, using the public telephone system requires that the system manager locate and connect with a telephone channel, which necessitates that the system manager be stationed at a fixed location during the communication.

Further, if the computer system wishes to contact the system manager through the telephone system, the manager must keep in contact with a telephone apparatus which listens for messages from the computer system.

OBJECTS OF THE INVENTION

An object of the invention is to provide improved administration of computer systems.

A further object of the invention is to provide a system by which a computer system can "page" an administrator using a cellular telephone system.

A further object of the invention is to provide a system which allows a system administrator to perform diagnostics on a computer system using a cellular telephone network.

SUMMARY OF THE INVENTION

In one form of the invention, a computer system monitors its error status. When the error status reaches a threshold, the computer system contacts a system manager, through a cellular telephone network, and delivers a message to the manager indicating the error status.

DETAILED DESCRIPTION OF THE INVENTION

One Embodiment

Figure 1A:
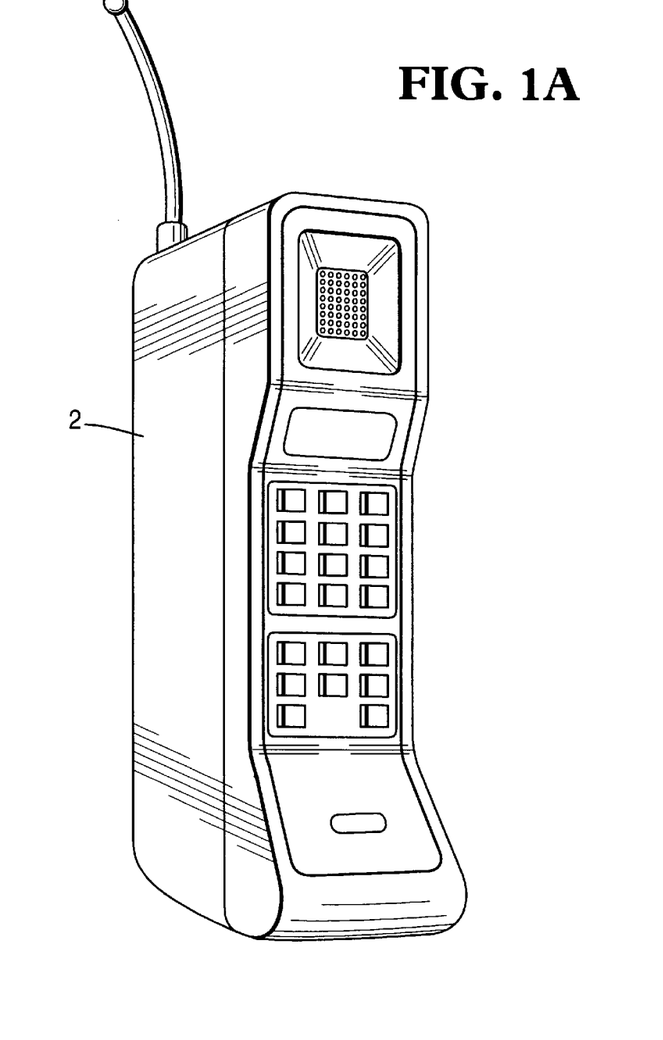
FIGS. 1A, 4A, 6 illustrate one form of the invention.
Figure 1B:
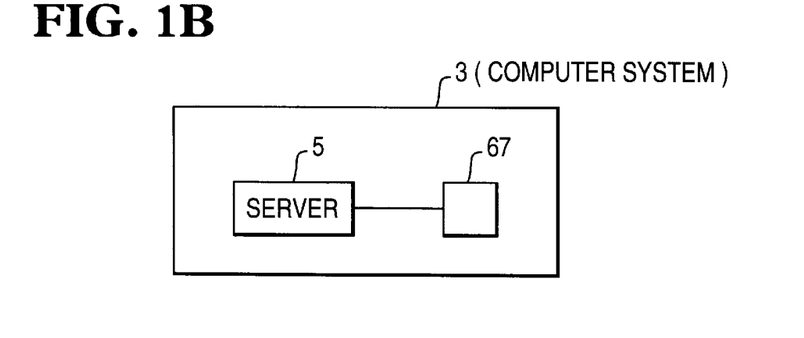
FIG. 1B illustrates an architecture which can be used by the invention.
Figure 2:
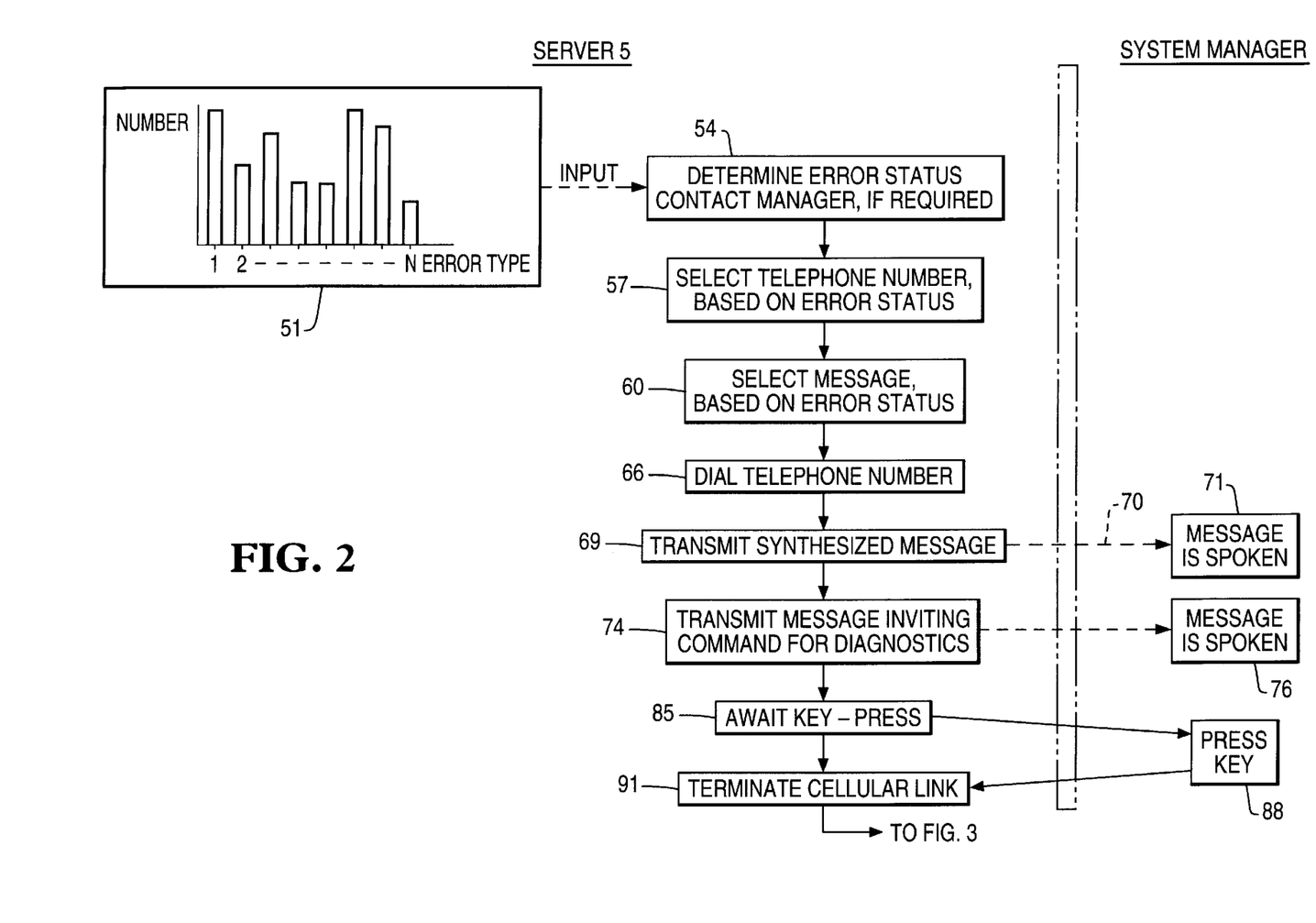
FIGS. 2 and 3 illustrate a flow chart illustrating logic implemented by one form of the invention.

FIG. 1A illustrates a standard cellular telephone 2, or other cellular appliance, which is used by a system manager (not shown) of computer system 3, in FIG. 1B which includes one or more servers 5. FIG. 2 shows a flow chart illustrating actions taken by server 5 in implementing the invention. Steps taken by the server 5 are illustrated on the left side of the FIG. 2. Steps taken by the system manager are shown on the right side.

Software, contained within the server 5 or an associated device, and known in the art, tracks error conditions occurring in the system, and maintains a table of errors which have occurred. Histogram 51 represents the table, and illustrates the number of errors of each type.

Software, represented by block 54, monitors the table 51 and, based on the number, and type, of errors, determines when it becomes necessary to contact a system manager. The particular formula for determining when an error condition requires intervention of a system manager will depend upon the particular system using the invention, and will vary from system-to-system.

However, in general, the process by which this determination is made can be viewed as solving an equation. That is, every error type in the histogram 51 is treated as a variable: error-type 1 is treated as variable "A", error-type 2 is treated as variable "B", and so on.

In addition, every error type is assigned a weight: error-type 1 is assigned weight W1, error-type 2 is assigned weight W2, and so on. With these assignments, the equation can be represented as follows:

$$\text{ERROR STATUS} = W1 \times A + W2 \times B + W3 \times C$$

In this equation, the number of each error-type which occurred, represented by A, B, C, etc., is multiplied by its respective weight. When the value of ERROR STATUS reaches a predetermined value, a system manager must be contacted, as indicated by block 54 in FIG. 2.

In one case, a single system manager may be contacted. In another case, different error conditions may require contacting different system managers. Block 57 represents the steps of ascertaining which system manager to contact, based on the errors which have occurred. As a simple example of determining whom to contact, each error type is initially assigned to a different system manager. Then, when a system manager must be contacted, the invention examines histogram 51, identifies the error type having the largest number of occurrences, and identifies the system manager assigned to that error type.

Irrespective of whether a single, predetermined system manager is to be contacted, or a system manager is to be selected from a list of system managers, the invention selects a telephone number of the system manager to be contacted, from a table of stored telephone numbers, as indicated by block 57. A significant feature of the telephone numbers is that they are serviced by a cellular telephone provider. That is, they are assigned to mobile cellular receivers.

Next, the invention selects an error message, as indicated by block 60. The error message is selected in order to convey useful information to the system manager. As an example, the message can indicate the error type which scores the highest on the histogram 51. As another example, the message can report the value of the variable ERROR STATUS computed in the equation given above. As a third example, the error message can report the individual variables of the equation (ie, A, B, C, etc.), thereby, in effect, reporting the histogram 51 itself.

Next, as indicated by block 66, the invention dials the telephone number selected. This dialing can be accomplished by issuing the proper commands to a telephone modem 67 in FIG. 1. This telephone number rings a commercially available cellular telephone service provider, causing the provider to establish a communication link with the cellular telephone 2 in FIG. 1A.

After the link is established, the invention, as indicated by block 69 in FIG. 2, and using commercially available speech-synthesis apparatus, synthesizes a spoken version of the message. This spoken version is transmitted to the cellular telephone 2 of FIG. 1A, as indicated by dashed arrow 70. The cellular telephone 2 produces the message, as indicated by block 71 in FIG. 2.

After delivering the synthesized speech, which indicates the error status of the computer system 3 of FIG. 1B, the server 5 invites the system manager to issue a command, as indicated by block 74 in FIG. 2, to initiate the execution of diagnostic routines by the server 5. For example, the server 5 can deliver a spoken message such as the following:

To initiate diagnostic procedure 1, press ONE now;

to initiate diagnostic procedure 2, press TWO now, etc.

Alternately, the server 5 can provide a description of each diagnostic procedure, rather than identifying them by number.

The cellular telephone 2 in FIG. 1A produces the spoken message, as indicated by block 76 in FIG. 2.

After delivering the spoken message, the server 5 awaits a key-press of the cellular telephone 2 of FIG. 1A, as indicated by block 85 in FIG. 2. The logic proceeds to block 88, indicating that the system manager presses a key, and then returns to block 91, indicating that the server 5 terminates the cellular telephone link. This termination reduces connect-time between the server 5 and the cellular telephone 2.

Figure 3:
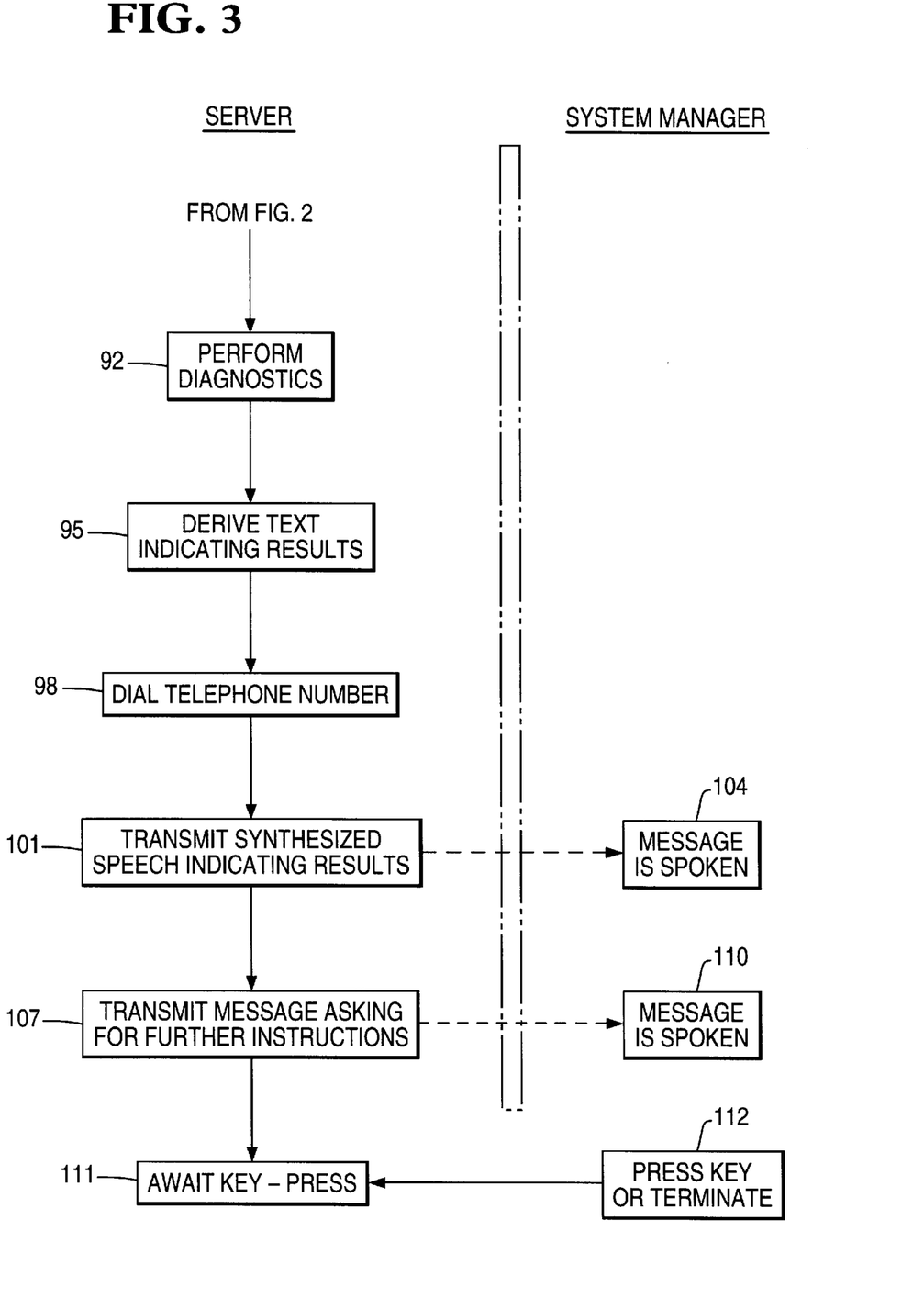

The server 5 then begins executing the diagnostic routines called for by the key-press received in block 91, as indicated by block 92 in FIG. 3. When the diagnostic routines are finished, a diagnostic file is produced, as indicated by block 95 in FIG. 3. The server 5 dials the same telephone number dialed previously, as indicated by block 98, synthesizes the contents of the diagnostic file, and delivers a message, in synthesized speech format, which reports the results of the diagnostics, as indicated by block 101. The cellular telephone 2 produces the message, as indicated by block 104.

This message can report the entire textual content of the diagnostic file, or can report a subset, such as the first 100 words. Further, the diagnostic routines can be designed so that they generate a report which is suited to delivery by speech synthesis.

After delivering the synthesized message, the server 5 then transmits a message asking for further instructions, as indicated by block 107, which the cellular telephone produces, as indicated by block 110. The server awaits a key-press, as block 111 indicates. As block 112 indicates, the system manager either terminates the cellular link, or issues further instructions, which are processed in a manner similar to that described above.

Therefore, in this form of the invention, a server in a computer system detects an error condition requiring attention of a system manager. The server generates text which describes the error condition. The server then contacts a system manager, by a cellular telephone link, and reports the error condition, by synthesizing speech, based on the text identified.

The server prompts the system manager to issue a command requesting that diagnostic routines be executed. When the command is received, the server terminates the cellular telephone link, and executes the diagnostics. The server then develops text which indicates the results of the diagnostics.

The server again dials the system manager, synthesizes speech which reports the results of the diagnostics, and the process either repeats in the same general manner, or terminates.

This discussion will now consider a more complex form of the invention.

Second Embodiment

Figure 4A:
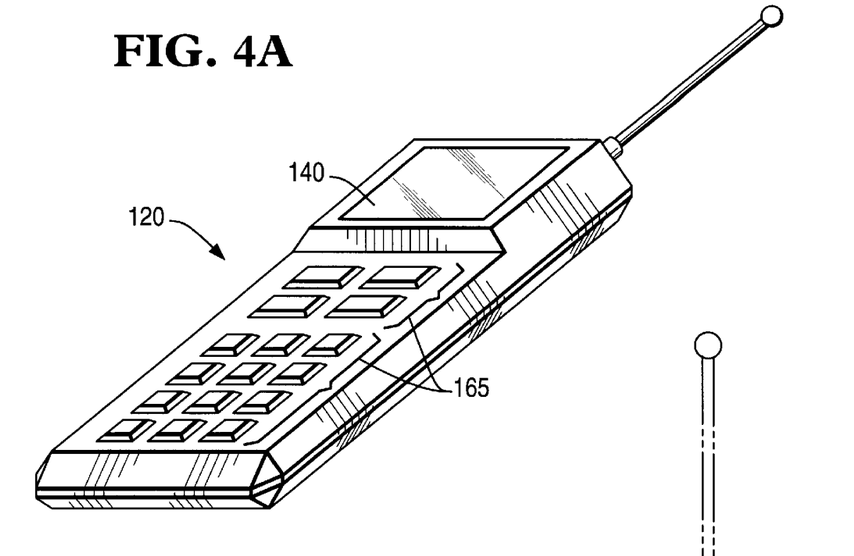
Figure 4B:
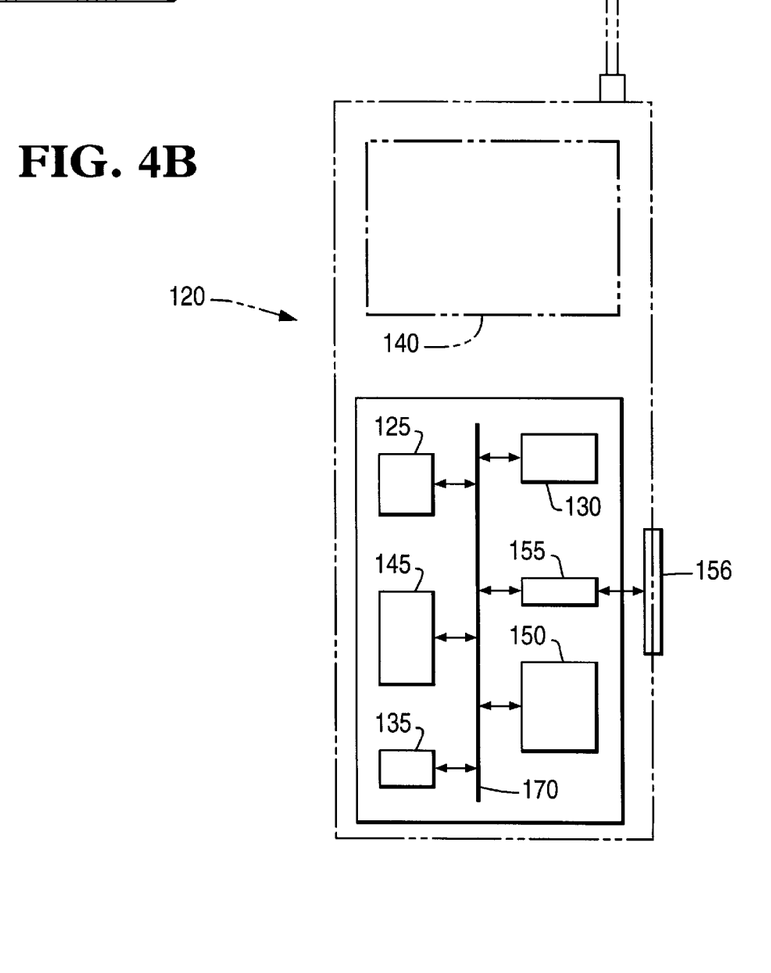
FIG. 4B is a schematic of one form of the invention.

The invention provides a cellular appliance 120 in FIGS. 4A and 4B.

The cellular appliance 120 can be viewed as a cellular telephone, together with a cellular modem, and combined with a subset of components taken from a micro-computer. One type of micro-computer can be that based on the "personal computer" architecture, designed by IBM Corporation around the 8XX86 family of microprocessors, which are available from INTEL Corporation, Santa Clara, Calif.

This subset of components include a microprocessor 125; memory 130, some of which is non-volatile, and used for storing programs; a cellular modem 135; a display 140; a video driver 145, which controls the display 140; text-to-speech conversion equipment 150 (or phoneme-to-speech conversion equipment); a serial port 155 with an associated connector 156; a standard telephone keypad 160; four additional keys 165; and a bus 170.

This subset of components is contained within a standard laptop computer (except for the cellular modem 135 and the text-to-speech conversion equipment 150, which are a commercially available accessories to the computer). Thus, the embodiment under discussion can be implemented using (1) a portable laptop computer, (2) a cellular telephone, (3) a cellular modem, (4) text-to-speech conversion equipment, all of which are known in the art. However, preferably, to reduce size and cost, some of the components of the computer are eliminated, such as disc drives and large, elaborate, displays. Single-board computers, containing a subset of the components of a laptop computer, and which implement the personal computer architecture are available from numerous sources, such as from Octagon Systems, 6510 West 91st Avenue, Westminister, Colo.

Figure 5:
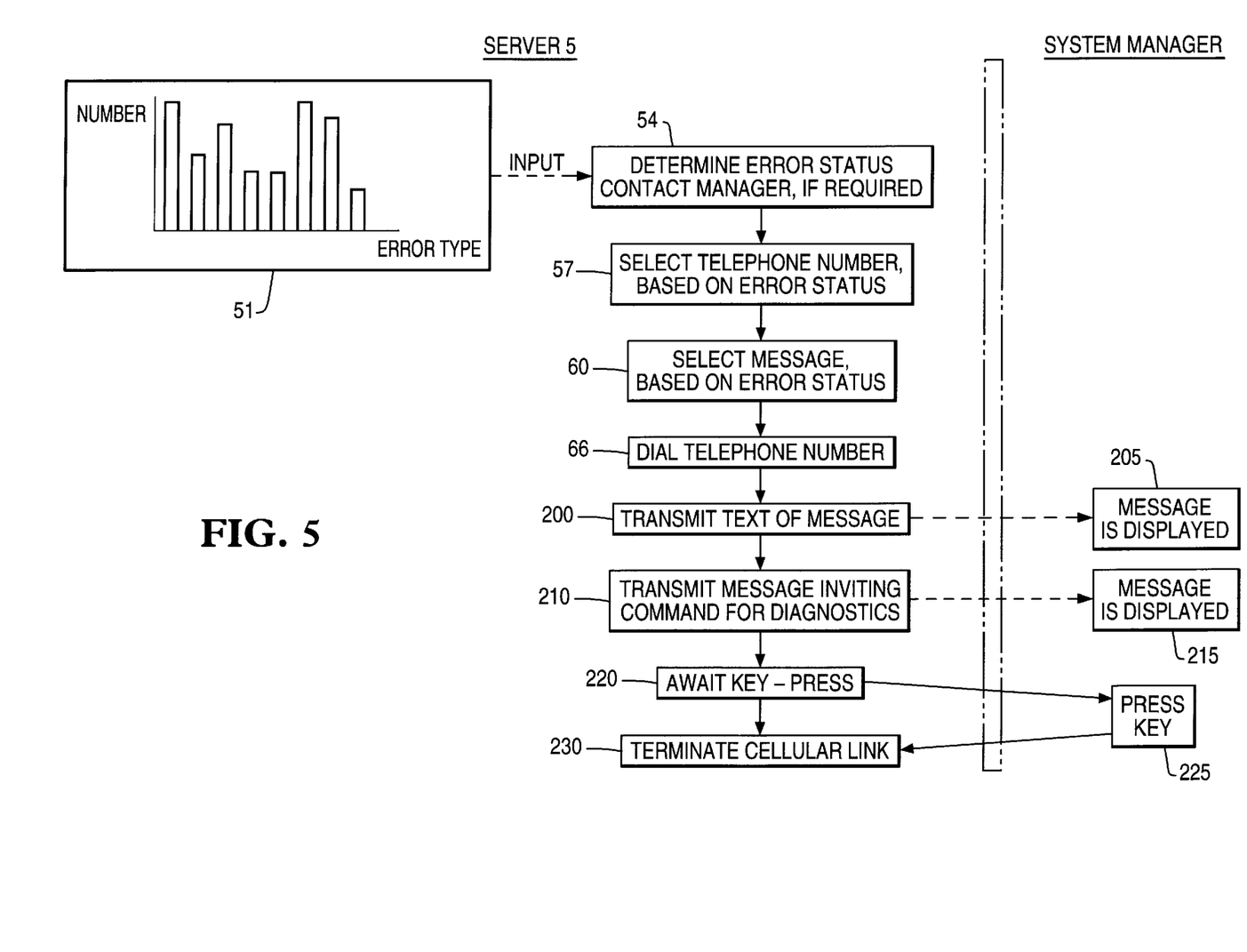
FIG. 5 is a more detailed flow chart illustrating logic implemented by one form of the invention.

Returning to FIG. 4B, the serial port 155 allows programs to be loaded into the memory 130. These programs are loaded into the nonvolatile section of memory 130, and respond to input provided by the system manager, through keys 165, as will now be described. FIG. 5 is a flow chart illustrating operation of the invention, and reproduces part of FIG. 2, namely, the part running through block 66, for which the steps are similar to those of FIG. 2. However, immediately following block 66, beginning in block 200, the steps differ.

In block 200, the invention transmits the actual ASCII text of the error message selected in block 60. The cellular appliance 120 of FIGS. 4A and 4B receives the message, and displays it on display 140, as indicated by block 205 in FIG. 5.

Next, in block 210, perhaps after a suitable delay, the server 5 transmits a text message inviting the cellular appliance to issue a command ordering that diagnostics be run, analogous to the message of block 74 in FIG. 2. The cellular appliance 120 displays the message, as indicated by block 215 in FIG. 5. The server awaits a key-press, as indicated by block 220.

The key-presses in question will be generated by auxiliary keys 165 in FIG. 4A. These keys are designed specifically for interaction with the server, and are uninvolved in telephone communication. The program, described above, which was loaded into memory 130, recognizes the keys 165, or combination of them, which are pressed, and transmits an appropriate sequence of commands to the server in response. This process is indicated by block 225 in FIG. 5. Then, as indicated by block 230, the server 5 terminates the cellular link. The server proceeds with the diagnostics, as above, and reports the results to the cellular appliance 120, in text format.

Significant Features and Additional Embodiments

1. The termination of the cellular link, prior to the server's executing the diagnostic routines, reduces cellular connect-time, which is considered desirable. However, in some situations, it can be desirable to maintain the cellular link while the server performs the diagnostics. Accordingly, an option for this link-maintenance is offered, as by a message printed on display 140, in FIGS. 4A and 4B, after execution of block 225.

2. The discussion above indicated two approaches for transmitting messages. In one approach, the server synthesized a spoken message, transmitted the spoken message over the cellular telephone link, and that the user of the cellular telephone 2 heard the message. In the second approach, the server transmitted ASCII text, which was displayed on display 140 of FIGS. 4A and 4B. Other approaches are possible.

In a third approach, the ASCII text is converted to speech by equipment 150 in FIG. 4B, contained within the cellular appliance 120. Text-to-speech equipment is commercially available. A disadvantage of this approach is that the text-to-speech equipment is required in the cellular appliance 120.

In a fourth approach, the message selected by the server is converted to speech, by the server, and then digitized, at the server. The digitized file is transmitted to the cellular appliance 120. The equipment 150 within the cellular appliance 120 comprises a digital-to-analog converter D/A, or a digital signal processor, which is used to play the speech.

An advantage of this approach is that equipment required to convert text into speech is not required in the cellular appliance 120. However, a disadvantage that digitized speech files can be lengthy, and can require a long connect-time. For example, high-quality digital reproduction of speech requires that the digitized waveform contain samples taken at the Nyquist rate, which is twice the highest frequency sought to be reproduced. If the highest frequency is 3,500 Hz, corresponding to the bandwidth of a common telephone channel, then 7,000 samples per second are required. If each sample requires one byte (ie, eight bits), then 7,000 bytes per second of message must be transmitted over the cellular link.

For example, if the word "malfunction" is part of the message, and requires exactly one second to speak, then that word requires 7,000 bytes to convey its information. In contrast, if that word were transmitted as an ASCII character sequence, as in one of the other approaches, then only eleven bytes are required, one for each letter of the word, plus overhead.

A fifth approach reduces the length of the file transmitted, without requiring the cellular appliance to contain text-to-speech equipment. In this approach, only phonemes are transmitted. Phonemes are individual sounds, of which words are constructed. As a simplistic example, the word "computer" consists of the phonemes "COM", "PEW", and "TER." The word "company" consists of the phonemes "COM" (same as in "computer"), "PAN", and "KNEE".

Thus, in a sense, words are "spelled" using phonemes as their "alphabet." Phonemes can be viewed as a phonetic alphabet.

Each phoneme can be identified by a code, just as the twenty-six letters of the English alphabet are identified by an ASCII code. For example, if 4,000 phonemes are assumed to exist (which is considered a high number), then twelve bits, or 1.5 bytes, can represent each phoneme. (Two raised to the power 12 equals 4096.)

Therefore, the server can transmit the message in the form of a sequence of phonemes. Specifically, a sequence of codes, each of 12 bits in this example, is transmitted, each representing one phoneme in the spoken message to be delivered. Speech-synthesis equipment, contained within the cellular appliance 120 in FIG. 4B, and represented by block 150 plays the sequence of phonemes.

3. When user presses a key of an ordinary touch-tone telephone a Dual-Tone, Multi-Frequency (DTMF) signal is produced, which is audible to the user. When a user presses one of the keys 165 in FIG. 4A, a similar DTMF signal can be produced.

However, preferably, the microprocessor, in running its programs, recognizes the key press, as by polling a keypad-buffer, analogous to the process of polling a keyboard buffer in a computer. When the microprocessor detects a key-press, the program issues a sequence of commands to the cellular modem 135, which are transmitted to the server, via the satellite link. No DTMF signals are involved.

Figure 6:
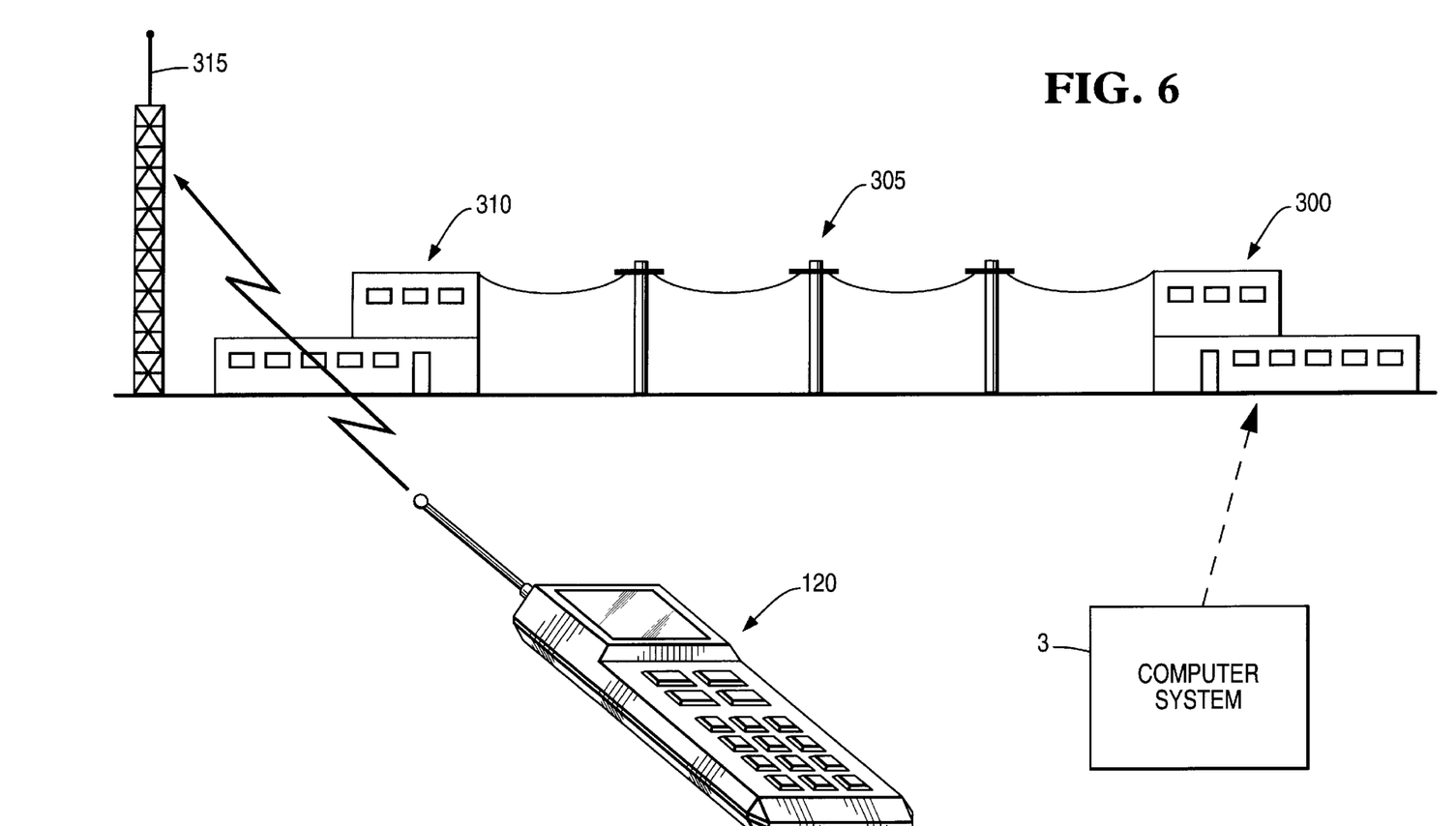

4. FIG. 6 illustrates a system which utilizes one form of the invention. A server 3 communicates with a commercial telephone switching station 300, which transmits the server's messages along a standard telephone channel 305, to a cellular service provider 310, which relays the message through antenna 315, to device 120, which is also shown in FIGS. 4A and 4B.

Numerous substitutions and modifications can be undertaken without departing from the true spirit and scope of the invention. What is desired to be secured by Letters Patent is the invention as defined in the following claims.

What is claimed is:

1. A method of operating a system of computers, comprising the following steps:

a) utilizing an automated system to monitor error conditions; and b) when error conditions reach a predetermined status,
  i) contacting a mobile cellular device, using a cellular telephone link;
  ii) synthesizing a spoken message; and
  iii) transmitting the spoken message along the cellular telephone link; and
  iv) awaiting a key press signal from the cellular device and, when one is received, beginning execution of a diagnostic routine indicated by the key-press signal.

2. Method according to claim 1, and further comprising the step of:

c) receiving a signal from the cellular device and, in response, performing diagnostic operations on the computer system.

3. Method according to claim 2, and further comprising the step of terminating the cellular telephone link prior to performance of the diagnostic operations.

4. Method according to claim 2, and further comprising the steps of d) after information has been obtained from the diagnostic operations, i) contacting the mobile cellular device, using a cellular telephone link;

ii) synthesizing a spoken message containing information obtained from the diagnostic operations; and iii) transmitting the spoken message along the cellular telephone link.

5. Method according to claim 1, wherein the spoken message identifies multiple errors, and identifies the number and type of each.

6. Method according to claim 1, wherein a group of cellular devices are available for contact, a device is selected from the group, based on the type of error occurring, and the selected cellular device is contacted using the cellular link.

7. Method according to claim 1, wherein attainment of said predetermined status is determined by a computation in which each error is assigned a weight, and a total score of weighted errors is computed.

8. Method according to claim 1, wherein the computer delivers a synthesized spoken message listing diagnostic procedures available.

9. Method according to claim 4, wherein the diagnostic operations produce an output file containing results of the diagnostic operations, and the spoken message describes at least some of these results.

10. A method of operating a system of computers, comprising the following steps:

a) monitoring error status and maintaining a record of the error status; and b) when the record indicates that the error status reaches a predetermined level, delivering a message through a cellular telephone link to a cellular device reporting the error status.

11. Method according to claim 10, and further comprising the following steps:

c) receiving a message through the cellular link which indicates diagnostic steps to be run; and then d) terminating the cellular link.

12. Method according to claim 11, and further comprising the following steps:

e) after terminating the cellular link, running the diagnostic steps; and then f) re-establishing the cellular link; and then g) reporting results of the diagnostic steps.

13. Method according to claim 10, wherein said monitoring is performed by software running on a computer.

14. Method according to claim 10, wherein said message is generated by a computer system.

15. Method according to claim 10, wherein said error status indicates number, and types, of multiple errors which occurred in the system of computers.

* * * * *